INVENTOR.
J. W. DAVISON 3,546,315
OLEFIN PURIFICATION
Joseph W. Davison, Bartlesville, Okla., assignor to Phillips Petroleum Company, a corporation of Delaware
Filed Dec. 26, 1967, Ser. No. 693,282
Int. Cl. C07c *3/62, 13/00, 7/00*
U.S. Cl. 260—683                                                6 Claims

ABSTRACT OF THE DISCLOSURE

An olefin is separated from a saturated hydrocarbon having the same number of carbon atoms per molecule by converting the olefin by the olefin reaction to a different olefin which can be readily separated from the saturated hydrocarbon and then reconverting the different olefin to the original olefin.

---

This invention relates to olefin purification. In one aspect, it relates to a method for separating an olefin from a saturated hydrocarbon having the same number of carbon atoms per molecule. In another aspect it relates to producing a stream of relatively pure propylene from a stream of propylene contaminated with propane.

The removal of a contaminating saturated hydrocarbon from an olefin hydrocarbon having the same number of carbon atoms per molecule often is difficult and expensive to accomplish by known separation means. For example, the separation of propane from a propylene stream or the separation of butane from a butene stream can be accomplished by conventional fractionation but this requires very expensive equipment, for example, fractional distillation columns having a very large number of trays.

An object of the invention is to purify an olefin. Another object of the invention is to remove a contaminating saturated hydrocarbon from an olefin having the same number of carbon atoms per molecule. Another object of the invention is to remove propane from a stream containing propylene. Another object of the invention is to produce substantially pure propylene from a stream contaminated with propane.

Other aspects, objects and the advantages of the invention are apparent in the written description, the drawing, and the claims.

According to the invention the purity of an olefin hydrocarbon stream is increased through the removal of a saturated hydrocarbon therefrom by converting at least a part of the desired olefin to one or more olefin hydrocarbons having a different number of carbon atoms per molecule without substantial conversion of the saturated hydrocarbon, separating the olefin hydrocarbons having a different number of carbon atoms per molecule from unconverted saturated hydrocarbons and converting at least a part of the olefin hydrocarbon having a different number of carbon atoms per molecule to the desired hydrocarbons by olefin reaction.

The olefin reaction is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction has been illustrated by the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyenes; for example, the conversion of ethylene and 4-methylpentene-2 yields 3-methylbutene-1 and propylene;

(4) The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclohexene and 2-butene yields 2,8-decadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

The catalysts which are useful for the present invention are those which have activity for the disproportionation of propylene into ethylene and butenes. Some examples of such catalysts are:

(1) silica or thoria promoted by an oxide or a compound convertible to the oxide by calcination or sulfide of tungsten or molybdenum or by an oxide or a compound convertible to the oxide by calcination of rhenium, vanadium, niobium, tellurium or tantalum;

(2) alumina promoted with an oxide or compound convertible to an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;

(3) one or more of the group zirconia, aluminum phosphate, zirconium phosphate, calcium phosphate, magnesium phosphate, or titanium phosphate promoted by one or more of a sulfide of molybdenum or tungsten, or an oxide or a compound convertible to the oxide by calcination of molybdenum, tungsten, vanadium, niobium, tantalum or rhenium or magnesium tungstate or beryllium phosphotungstate; and (4) silica, alumina, zirconia, aluminum phosphate, zirconium phosphate, calcium phosphate, magnesium phosphate, or titanium phosphate promoted by a hexacarbonyl of molybdenum or tungsten.

The catalysts of (1) can be prepared and activated by conventional techniques such as by combining a catalyst grade silica with suitable tungsten, molybdenum, rhenium, vanadium, niobium, tellurium, or tantalum compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the support material, such as zirconia, can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in the air at elevated temperatures.

The catalyst compositions of (4) can be prepared and activated by impregnating a previously calcined support material, such as calcium phosphate, with a solution of the hexacarbonyl of the promoter in an organic solvent such as benzene, followed by drying in a vacuum or in an inert atmosphere at about 50 to 700° F.

The catalytic agent is considered to be the reaction product resulting from the admixture of the support material and the promoter material which is subjected to activation treatment.

The operating temperature for the process of this invention when using catalysts of (1) is in the range of about 400 to 1100° F. The process of this invention when using the catalysts of (2) will be operated at a temperature in the range of about 150 to 500° F. The process using the catalysts of (3) will be carried out at a temperature of about 600 to 1200° F. The process using the catalysts of (4) will be carried out at a temperature of about 0 to 600° F. In the process of the invention, pressures are not important but will be in the range of about 0 to 2,000 p.s.i.g.

Other catalysts include those disclosed in Ser. No. 412,343, filed Nov. 19, 1964, now Pat. No. 3,395,196; Ser. No. 517,918, filed Jan. 3, 1966, now Pat. No. 3,442,969; Ser. No. 517,905, filed Jan. 3, 1966, now Pat. No. 3,444,262; Ser. No. 421,692, filed Dec. 28, 1964, now Pat. No. 3,418,390; Ser. No. 529,230, filed Feb. 23, 1966, and now abandoned; Ser. No. 516,673, filed Dec. 27, 1965; and U.S. Pat. No. 3,261,879, issued July 19, 1966.

The finished catalyst can be in the form of powder, or granules as well as in other shapes such as agglomerates, pellets, spheres, extrudates, beads, and depending upon the type of contacting technique which utilizes the catalyst.

Figure 1:
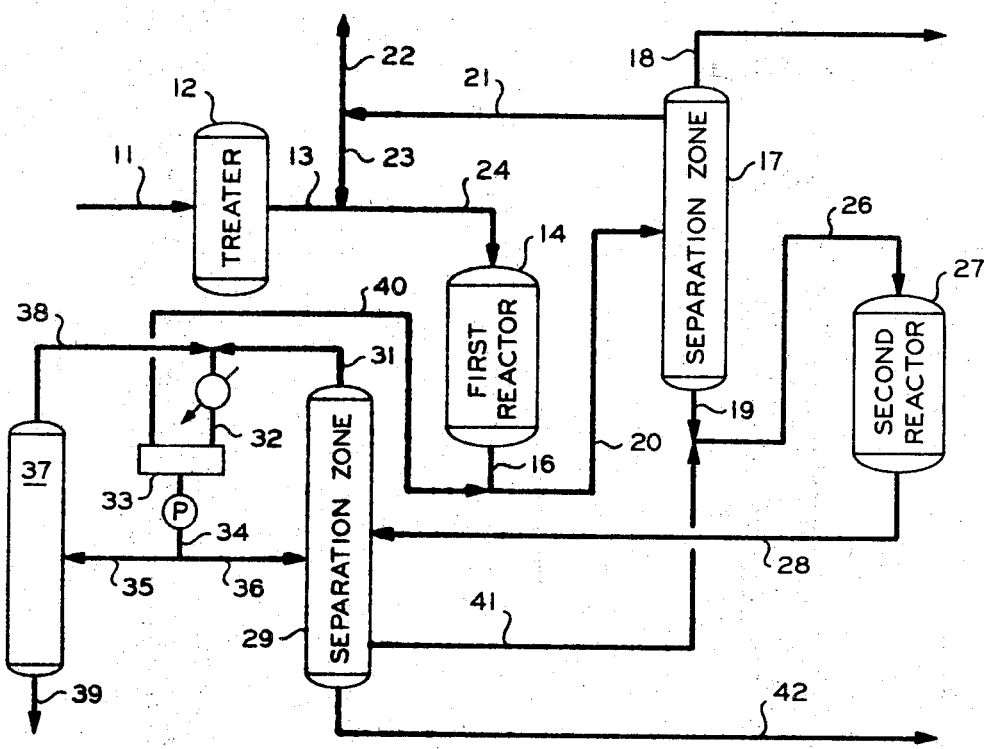
FIG. 1 is a schematic illustration of a system for practicing the invention utilizing two olefin reactors.

In FIG. 1, pipe 11 supplies feed to treater 12 for purification of the olefin feed stream. Pipe 13 conducts the effluent from treater 12 and connects with pipe 24 which feeds into first reactor 14. Pipe 16 conducts the effluent from reactor 14, which effluent is combined with overhead from separator 29 as described below and fed through pipe 20 into separator 17. Pipe 18 is provided for the overhead for separator 17 along with pipe 19 for the bottoms product and pipe 21 for an intermediate stream. Pipe 21 connects with bleed pipe 22 and recycle pipe 23. Pipe 26 feeds second reactor 27, the effluent of which is removed through pipe 28 to separator 29. The overhead from separator 29 passes through pipe 31, is condensed in a condenser and passed through pipe 32 to overhead accumulator 33. Liquid from accumulator 33, removed through pipe 34, is split and pumped through pipes 35 and 36 to separator 37 and as reflux to separator 29, respectively. The overhead from separator 37 is passed through pipe 38 and returned to pipe 31. Bottoms product from separator 37 is removed through pipe 39. Vapor from accumulator 33 is passed through line 40 and combined with the bottoms product from reactor 14 and passed through pipe 20 to separator 17.

In the operation of the invention as illustrated in FIG. 1, a stream comprising an olefin hydrocarbon and a saturated hydrocarbon having the same number of carbon atoms per molecule passes through pipe 11, treater 12 and pipe 13 into first reactor 14. In reactor 14, the olefin hydrocarbon is converted to other olefin hydrocarbons, often olefins having both larger and smaller numbers of carbon atoms per molecule. In separation zone 17, the unconverted original olefin and the contaminated saturated hydrocarbon are removed through pipe 21. An amount sufficient to prevent build-up of the saturated hydrocarbon is bled through pipe 22 and the remainder returned through pipe 23 to pipe 13 in reactor 14. Olefins heavier than the original olefin are removed through pipe 19 and pass through pipe 26 to second reactor 27. In reactor 27 these heavier olefins are converted by the olefin reaction to produce a quantity of the original olefin which is removed through pipe 39 as a product stream. Olefins heavier than the original olefin but readily convertible to the original olefin are recycled through pipe 41 and pipe 26 as recycle to the second reactor. Still heavier olefins are recovered through pipe 42. Olefins lighter than the original olefin are passed from accumulator 33 and pipe 40 with the effluent from first reactor 14 and fed to separator 17.

Figure 2:
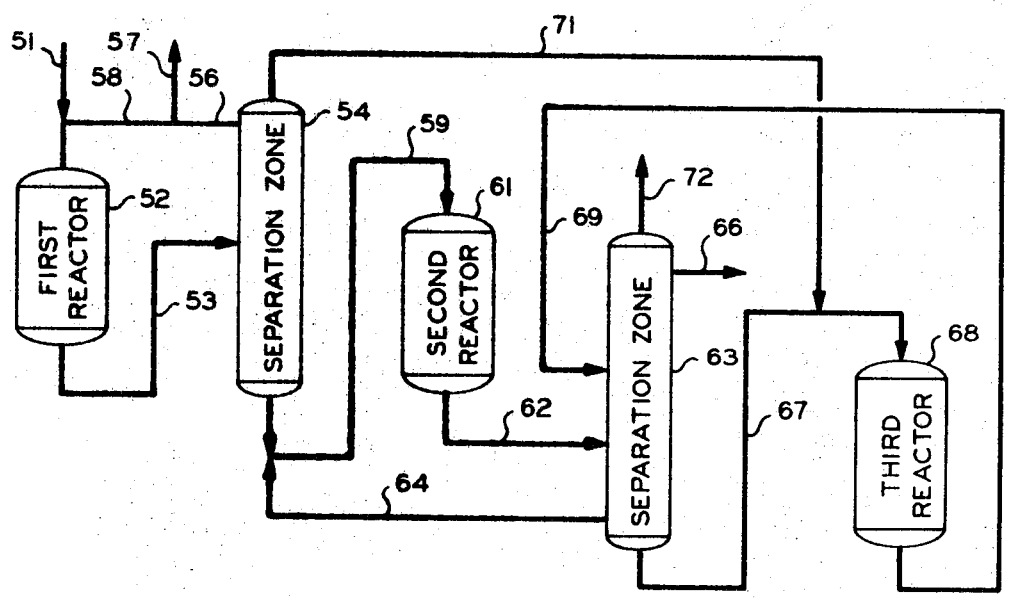
FIG. 2 is a schematic illustration of another system for performing the invention utilizing three olefin reactors.

In the apparatus as illustrated in FIG. 2, a pipe 51 feeds first reactor 52 and pipe 53 conducts the effluent from reactor 52 to separation zone 54. Pipe 56 removes an intermediate stream from separation zone 54 to bleed pipe 57 and recycle pipe 58. Pipe 59 is provided to conduct heavier olefins from separation zone 54 to second reactor 61 while pipe 62 conducts the effluent from reactor 61 to separation zone 63. The pipe 64 is provided to conduct an intermediate cut from separation zone 63 to pipe 59. Pipe 66 is a product removal line while pipe 67 conducts heavier olefins from separation zone 63 to a third reactor 68. Effluent from reactor 68 is returned through pipe 69 to separation zone 63. The overhead from separation zone 54 is passed through pipe 71 to pipe 67 for feed to third reactor 68. Lighter products from separation zone 63 are removed through pipe 72.

In the operation of the invention as illustrated in FIG. 2, the operation of first reactor 52, separation zone 54, second reactor 61, and separation zone 63 correspond essentially to the operation of reactor 14, separation zone 17, reactor 27 and separation zone 29, respectively, in the invention as illustrated in FIG. 1. However, the third reactor 68 is provided for further conversion of the heavier products from separation zone 63 and lighter products from separation zone 54 to produce additional quantities of the original olefin. The effluent from third reactor 68 passes through pipe 69 to separation zone 63 as illustrated. If desired, the effluent from pipe 72 can be returned to first reactor 52 or passed to third reactor 68.

When it is desired to produce a relatively pure stream of propylene from a stream contaminated with propane, the stream comprising propylene and propane is fed through pipe 51 to first reactor 52. The effluent from reactor 52 comprising ethylene, propylene, butene and propane is fed to separation zone 54. A relatively pure stream of ethylene is removed through overhead pipe 71, a stream comprising substantially all of the propylene and propane is removed through pipe 56, a portion bled off through pipe 57 to prevent build-up of propane and the remainder returned to pipe 52 through pipe 58.

The bottoms product from separation zone 54, comprising butenes, is fed through pipe 59 to second reactor 61 wherein the butenes are converted to produce additional quantities of propylene. The effluent from reactor 61 then passes through pipe 62 to separation zone 63. Product propylene of high purity is removed through pipe 66. A small bleed stream comprising any ethylene and a minor quantity of propylene is removed through pipe 72. Butenes are removed through pipe 64 and returned to second reactor 61 while olefins heavier than butenes are removed through pipe 67 and passed to a third reactor 68 along with the ethylene in pipe 71. The reaction of ethylene with internal olefins produces olefins of smaller number of carbon atoms per molecule. For example, reaction of ethylene with pentene-2 produces propylene and butene. The reaction of ethylene with hexene-2 produces propylene and pentene while reaction of ethylene with hexene-3 produces butene. By feeding the effluent from third reactor 68 into separation zone 63, additional amounts of propylene can be produced through pipe 66 and additional quantities of butene is returned through pipe 64 to be further converted to additional propylene.

If desired, the overhead from separation zone 63 through pipe 72 can also be passed to third reactor 68, if desired.

Other modifications of the invention will be apparent from the disclosure of the present invention. For example, in some instances, it may be desirable to return one or more olefins to second reactor 61 for additional reaction with the elimination of third reactor 68. On the other hand, additional olefin reactors can be provided for conversion of specific olefin products to other desired products, e.g., propylene.

In an example according to the invention, a stream of propylene is purified utilizing a system as illustrated in FIG. 1. In reactor 14, the catalyst is tungsten oxide supported on silica and the reaction operates at 450 p.s.i.a. and 800° F. Separators 17, 29 and 37 are fractional distillation columns. Reactor 27 is also operated at 450 p.s.i.a. and 800° F. with a tungsten oxide on silica catalyst. The table presents a material balance of various streams in the system, the streams having numbers corresponding with the numbers of pipes in FIG. 1.

TABLE

| Stream No | 13 | 24 | 16 | 20 | 19 | 18 | 21 | 22 | 26 | 28 |
|---|---|---|---|---|---|---|---|---|---|---|
| Component, mols/hour: | | | | | | | | | | |
| Ethylene | 0.05 | 21.52 | 265.42 | 275.23 | | 252.63 | 22.60 | 1.13 | 0.31 | 10.16 |
| Ethane | 0.05 | 0.06 | 0.06 | 0.06 | | 0.05 | 0.01 | | | |
| Propylene | 490.00 | 1,249.11 | 766.50 | 803.30 | 0.14 | 0.82 | 802.34 | 43.23 | 15.68 | 133.47 |
| Propane | 33.55 | 603.51 | 603.51 | 603.61 | 0.60 | 0.51 | 602.50 | 32.54 | 0.71 | 0.71 |
| Butenes | 0.26 | 11.91 | 245.53 | 245.54 | 233.22 | | 12.32 | 0.67 | 511.48 | 284.18 |
| Pentenes | | | | 5.09 | 5.09 | 5.09 | | | 32.13 | 101.33 |
| Hexenes | | | | | | | | | 3.43 | 27.88 |
| Heptenes | | | | | | | | | 0.31 | 5.27 |
| Octenes | | | | | | | | | 0.05 | 0.85 |
| Nonenes | | | | | | | | | 0.01 | 0.21 |
| Decenes | | | | | | | | | | 0.04 |
| Total, mols/hour | 523.91 | 1,886.11 | 1,886.11 | 1,932.83 | 239.05 | 254.01 | 1,439.77 | 77.57 | 564.11 | 564.11 |
| Propylene, conc. mol percent | 93.7 | | | | | | | 55.75 | | |

| Stream No | 31 | 41 | 42 | 32 | 34 | 36 | 35 | 38 | 39 | 40 |
|---|---|---|---|---|---|---|---|---|---|---|
| Component, mols/hour: | | | | | | | | | | |
| Ethylene | 58.00 | 0.31 | | 106.11 | 96.30 | 48.15 | 48.15 | 48.11 | 0.04 | 9.81 |
| Ethane | | | | | | | | | | |
| Propylene | 669.76 | 15.54 | 0.30 | 1,141.06 | 1,104.26 | 552.13 | 552.13 | 471.30 | 80.83 | 36.80 |
| Propane | 2.34 | 0.11 | | 3.58 | 3.48 | 1.74 | 1.74 | 1.24 | 0.50 | 0.10 |
| Butenes | 0.15 | 278.26 | 5.87 | 0.21 | 0.20 | 0.10 | 0.10 | 0.06 | 0.04 | 0.01 |
| Pentenes | | 27.04 | 74.29 | | | | | | | |
| Hexenes | | 3.43 | 24.45 | | | | | | | |
| Heptenes | | 0.31 | 4.96 | | | | | | | |
| Octenes | | 0.05 | .80 | | | | | | | |
| Nonenes | | 0.01 | 0.20 | | | | | | | |
| Decenes | | | 0.04 | | | | | | | |
| Total, mols/hour | 730.25 | 325.06 | 110.91 | 1,250.96 | 1,204.24 | 602.12 | 602.12 | 520.71 | 81.41 | 46.72 |
| Propylene, conc. mol percent | | | | | | | | | 99.29 | |

I claim:

1. A method for producing a relatively pure desired olefin hydrocarbon from a first stream also containing a saturated hydrocarbon having the same number of carbon atoms per molecule, comprising the steps of:
feeding the first stream into a first olefin reaction zone;
in said olefin reaction zone disproportionating at least a part of said desired olefin hydrocarbon to one or more olefin hydrocarbons having a different number of carbon atoms per molecule, without substantial conversion of the saturated hydrocarbon;
separating the olefin hydrocarbons having a different number of carbon atoms per molecule from any unconverted desired olefin hydrocarbon and the saturated hydrocarbon to produce a recycle stream;
removing an amount of the recycle stream at least sufficient to prevent build-up of the saturated hydrocarbon and returning the remainder of the recycle stream to said olefin reaction zone; and
disproportionating at least a part of the olefin hydrocarbon having a different number of carbon atoms per molecule to the desired olefin hydrocarbon in a second olefin reaction zone.

2. The method of claim 1 wherein the desired olefin hydrocarbon is propylene and the saturated hydrocarbon is propane.

3. The method of claim 1 wherein:

the first stream comprising propylene and propane is fed into the first olefin reaction zone wherein at least a part of the propylene is disproportionated to produce butene;

the effluent from the first olefin reaction zone is separated into a second stream comprising ethylene, a third stream comprising propane and unconverted propylene, and a fourth stream comprising butene;

the fourth stream is fed into the second olefin reaction zone wherein butene is disproportionated to produce propylene;

the effluent from the second olefin reaction zone is separated into a fifth stream comprising ethylene; a product stream comprising at least 99 percent pure propylene, a sixth stream comprising butene, and a seventh stream comprising any $C_5$ and heavier olefins; and the sixth stream is returned to the second olefin reaction zone.

4. The method of claim 3 wherein the fifth stream is returned to the first olefin reaction zone.

5. The method of claim 3 wherein the second stream and the seventh stream are converted in an olefin reaction zone wherein ethylene and an internal olefin of said $C_5$ and heavier olefins are converted to produce at least one olefin selected from propylene and butene.

6. The method of claim 1 wherein ethylene is produced in the first olefin reaction zone in the disproportionating of said desired olefin hydrocarbon, an olefin heavier than said desired olefin is produced by disproportionating said olefin hydrocarbon having a different number of carbon atoms per molecule in said second olefin reaction zone and said ethylene and said olefin heavier than said desired olefin hydrocarbon are converted in a third olefin reaction zone to produce an additional amount of at least one olefin selected from said desired olefin and said olefin having a different number of carbon atoms per molecule.

References Cited
UNITED STATES PATENTS

| | | | |
|---|---|---|---|
| 2,614,137 | 10/1952 | Chenicek | 260—683 |
| 2,433,465 | 12/1947 | Leum et al. | 260—677 |
| 3,261,879 | 7/1966 | Banks | 260—683 |

DELBERT E. GANTZ, Primary Examiner

C. E. SPRESSER, JR., Assistant Examiner

U.S. Cl. X.R.

260—676, 677, 680